US012682109B2

(12) United States Patent
Segev et al.

(10) Patent No.: US 12,682,109 B2
(45) Date of Patent: Jul. 14, 2026

(54) TECHNIQUES FOR CONTEXTUALLY ENRICHED DATA CLASSIFICATION AND SECURING COMPUTING ENVIRONMENTS USING CONTEXTUALLY ENRICHED DATA

(71) Applicant: Cyera, Ltd., Tel Aviv (IL)

(72) Inventors: Yotam Segev, New York, NY (US); Itamar Bar-Ilan, New York, NY (US); Yonatan Itai, Tel Aviv (IL); Guy Gertner, Holon (IL); Shiran Bareli, Tel Aviv (IL); Alona Getzler, Givat Shmuel (IL); Michal Shaked, Nofit (IL); Dvir Horovitz, Givaatayim (IL); Michael Elazar, Ramat Gan (IL); Yifat Dancygier, Kiryat Tivon (IL)

(73) Assignee: Cyera, Ltd., Tel Aviv (IL)

( * ) Notice: Subject to any disclaimer, the term of this patent is extended or adjusted under 35 U.S.C. 154(b) by 90 days.

(21) Appl. No.: 18/780,827

(22) Filed: Jul. 23, 2024

(65) Prior Publication Data

US 2026/0030381 A1     Jan. 29, 2026

(51) Int. Cl.
G06F 21/62 (2013.01)
G06F 16/28 (2019.01)
(52) U.S. Cl.
CPC ........ G06F 21/6245 (2013.01); G06F 16/285 (2019.01)
(58) Field of Classification Search
CPC ........................... G06F 21/6245; G06F 16/285
See application file for complete search history.

(56) References Cited

U.S. PATENT DOCUMENTS

| | | | |
|---|---|---|---|
| 9,027,125 B2 | 5/2015 | Kumar et al. |
| 9,430,564 B2 | 8/2016 | Ahuja et al. |
| 9,558,193 B2 | 1/2017 | Lim |
| 9,734,169 B2 | 8/2017 | Redlich et al. |
| 10,778,713 B2 | 9/2020 | Zeng et al. |

(Continued)

FOREIGN PATENT DOCUMENTS

CN     110535836 A     12/2019

OTHER PUBLICATIONS

International Search Report for PCT/IB2025/056413, dated Sep. 30, 2025. Searching Authority, Israel Patent Office, Jerusalem, Israel.

(Continued)

*Primary Examiner* — Mohammad W Reza
(74) *Attorney, Agent, or Firm* — M&B IP Analysts, LLC

(57)     ABSTRACT

A system and method for data classification. A method includes: determining a role for each of a plurality of portions of data, wherein the role for each of the plurality of portions of data is defined with respect to a corresponding entity having at least one characteristic represented by the respective portion of data; classifying each of the plurality of portions of data into a plurality of classifications, wherein classifying at least one first portion of data among the plurality of portions of data further comprises applying a classification for at least one second portion of data among the plurality of portions of data to the at least one first portion of data, wherein the role of the at least one first portion of data and the role of the at least one second portion of data match; and performing at least one remediation action based on the plurality of classifications.

23 Claims, 7 Drawing Sheets

(56) References Cited

U.S. PATENT DOCUMENTS

| | | | |
|---|---|---|---|
| 10,984,122 B2 | 4/2021 | Thomas | |
| 11,669,965 B2 | 6/2023 | Yao et al. | |
| 11,947,529 B2 | 4/2024 | Gasper et al. | |
| 2018/0254051 A1* | 9/2018 | Church | H04M 3/51 |
| 2019/0180048 A1 | 6/2019 | Koduri et al. | |
| 2020/0027050 A1* | 1/2020 | Ghosh | G06Q 10/0631 |
| 2020/0342860 A1* | 10/2020 | Ju | G10L 21/028 |
| 2021/0026872 A1 | 1/2021 | Saillet et al. | |
| 2022/0035862 A1 | 2/2022 | Ben-Natan | |
| 2023/0017384 A1 | 1/2023 | Woodward et al. | |
| 2023/0125170 A1* | 4/2023 | Sanders | H04M 3/4936 |
| | | | 704/235 |
| 2023/0143885 A1 | 5/2023 | Day, Jr. et al. | |
| 2023/0418876 A1 | 12/2023 | Van Dusen | |

OTHER PUBLICATIONS

Written Opinion of the Searching Authority for PCT/IB2025/056413, dated Sep. 30, 2025. Searching Authority, Israel Patent Office, Jerusalem, Israel.

* cited by examiner

TECHNIQUES FOR CONTEXTUALLY ENRICHED DATA CLASSIFICATION AND SECURING COMPUTING ENVIRONMENTS USING CONTEXTUALLY ENRICHED DATA

TECHNICAL FIELD

The present disclosure relates generally to cybersecurity techniques for protecting data in data stores, and more specifically to securing computing environments including data stores using contextually enriched data classifications.

BACKGROUND

Personally identifiable information (PII) data and other identifying data that can be used to learn the identity or other information about a given person are very desirable for hackers or other cyber attackers because of the value they can provide. Specifically, this information can be used to steal finances (e.g., by stealing credit card or bank information), engage in identity theft, sold, or otherwise used for profit. Thus, data stores containing PII are prime targets for cyber attacks. Some particularly sensitive PII, such as social security numbers or financial information, could be and have been used to ruin the lives of individuals whose data was stolen in cyber attacks.

Businesses that gather customer data and governmental entities that gather citizen data as part of their operations can a mass significant amounts of PII over time. Cyber threats aimed at stealing sensitive personal data pose a significant risk to these entities, which may be subject to regulations related to data protection and seek to mitigate legal exposure that may occur in the event of a breach. At the same time, applying extreme cybersecurity measures to all data collected by these entities can be incredibly burdensome in terms of resources which must be devoted to securing all such data.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for data classification. The method comprises: determining a role for each of a plurality of portions of data, wherein the role for each of the plurality of portions of data is defined with respect to a corresponding entity having at least one characteristic represented by the respective portion of data; classifying each of the plurality of portions of data into a plurality of classifications, wherein classifying at least one first portion of data among the plurality of portions of data further comprises applying a classification for at least one second portion of data among the plurality of portions of data to the at least one first portion of data, wherein the role of the at least one first portion of data and the role of the at least one second portion of data match; and performing at least one remediation action based on the plurality of classifications.

Certain embodiments disclosed herein also include a non-transitory computer readable medium having stored thereon causing a processing circuitry to execute a process, the process comprising: determining a role for each of a plurality of portions of data, wherein the role for each of the plurality of portions of data is defined with respect to a corresponding entity having at least one characteristic represented by the respective portion of data; classifying each of the plurality of portions of data into a plurality of classifications, wherein classifying at least one first portion of data among the plurality of portions of data further comprises applying a classification for at least one second portion of data among the plurality of portions of data to the at least one first portion of data, wherein the role of the at least one first portion of data and the role of the at least one second portion of data match; and performing at least one remediation action based on the plurality of classifications.

Certain embodiments disclosed herein also include a system for data classification. The system comprises: a processing circuitry; and a memory, the memory containing instructions that, when executed by the processing circuitry, configure the system to: determine a role for each of a plurality of portions of data, wherein the role for each of the plurality of portions of data is defined with respect to a corresponding entity having at least one characteristic represented by the respective portion of data; classify each of the plurality of portions of data into a plurality of classifications, wherein classifying at least one first portion of data among the plurality of portions of data further comprises applying a classification for at least one second portion of data among the plurality of portions of data to the at least one first portion of data, wherein the role of the at least one first portion of data and the role of the at least one second portion of data match; and perform at least one remediation action based on the plurality of classifications.

Certain embodiments disclosed herein include the method, non-transitory computer readable medium, or system noted above or below, further including or being configured to perform the following step or steps: applying at least one security policy to the plurality of portions of data based on the plurality of classifications and at least one activity performed with respect to at least one of the plurality of portions of data.

Certain embodiments disclosed herein include the method, non-transitory computer readable medium, or system noted above or below, further including or being configured to perform the following step or steps: determining a plurality of role scores for each of the plurality of portions of data, wherein each role score corresponds to a role among a plurality of potential roles and indicates a likelihood that the respective portion of data belongs to the corresponding role, wherein the role for each of the plurality of portions of data is determined based on the plurality of role scores for the portion of data.

Certain embodiments disclosed herein include the method, non-transitory computer readable medium, or system noted above or below, further including or being configured to perform the following step or steps: grouping at least some of the plurality of portions of data into at least one data grouping; and determining a plurality of grades for each data grouping based on the role scores for each of the portions of data among the data grouping, wherein each grade corresponds to a role and indicates a likelihood that the respective data grouping belongs to the corresponding role, wherein the role for each of the plurality of portions of data is determined based further on the plurality of grades for the at least one data grouping.

Certain embodiments disclosed herein include the method, non-transitory computer readable medium, or system noted above or below, wherein each of the at least one data grouping includes a subset of the plurality of portions of data which are at least one of: in a same table, in linked tables, and in linked files.

Certain embodiments disclosed herein include the method, non-transitory computer readable medium, or system noted above or below, wherein the plurality of classifications includes a plurality of identifiability classifications, each identifiability classification corresponding to a respective portion of data among the plurality of portions of data, wherein the identifiability classification for a portion of data indicates whether the portion of data uniquely identifies an individual.

Certain embodiments disclosed herein include the method, non-transitory computer readable medium, or system noted above or below, further including or being configured to perform the following step or steps: identifying at least one quasi-identifiable portion of data among the plurality of portions of data, wherein each quasi-identifiable portion of data includes data which uniquely identifies an individual when combined with other quasi-identifiable portions of data, wherein the plurality of identifiability classifications is determined based on the identified at least one quasi-identifiable portion of data.

Certain embodiments disclosed herein include the method, non-transitory computer readable medium, or system noted above or below, wherein the at least one quasi-identifiable portion of data is a plurality of quasi-identifiable portions of data, further including or being configured to perform the following step or steps: determining a proximity between at least some of the plurality of quasi-identifiable portions of data, wherein the plurality of identifiability classifications is determined based further on the determined proximity between at least some of the plurality of quasi-identifiable portions of data.

Certain embodiments disclosed herein include the method, non-transitory computer readable medium, or system noted above or below, wherein the plurality of classifications includes a plurality of geolocation classifications, each geolocation classification corresponding to a respective portion of data among the plurality of portions of data, wherein the geolocation classification for each portion of data indicates a geolocation of the corresponding entity for the portion of data.

Certain embodiments disclosed herein include the method, non-transitory computer readable medium, or system noted above or below, wherein the plurality of portions of data are classified with respect to data protection status, wherein the data protection status for each of the plurality of portions of data is defined with respect to a type of data protection which is applied to the respective portion of data.

Certain embodiments disclosed herein include the method, non-transitory computer readable medium, or system noted above or below, wherein the plurality of portions of data are classified with respect to a likelihood that each of the plurality of portions of data is synthetic.

DRAWING INFO FOR BRIEF DESCRIPTION

DETAILED DESCRIPTION

Figure 1A:
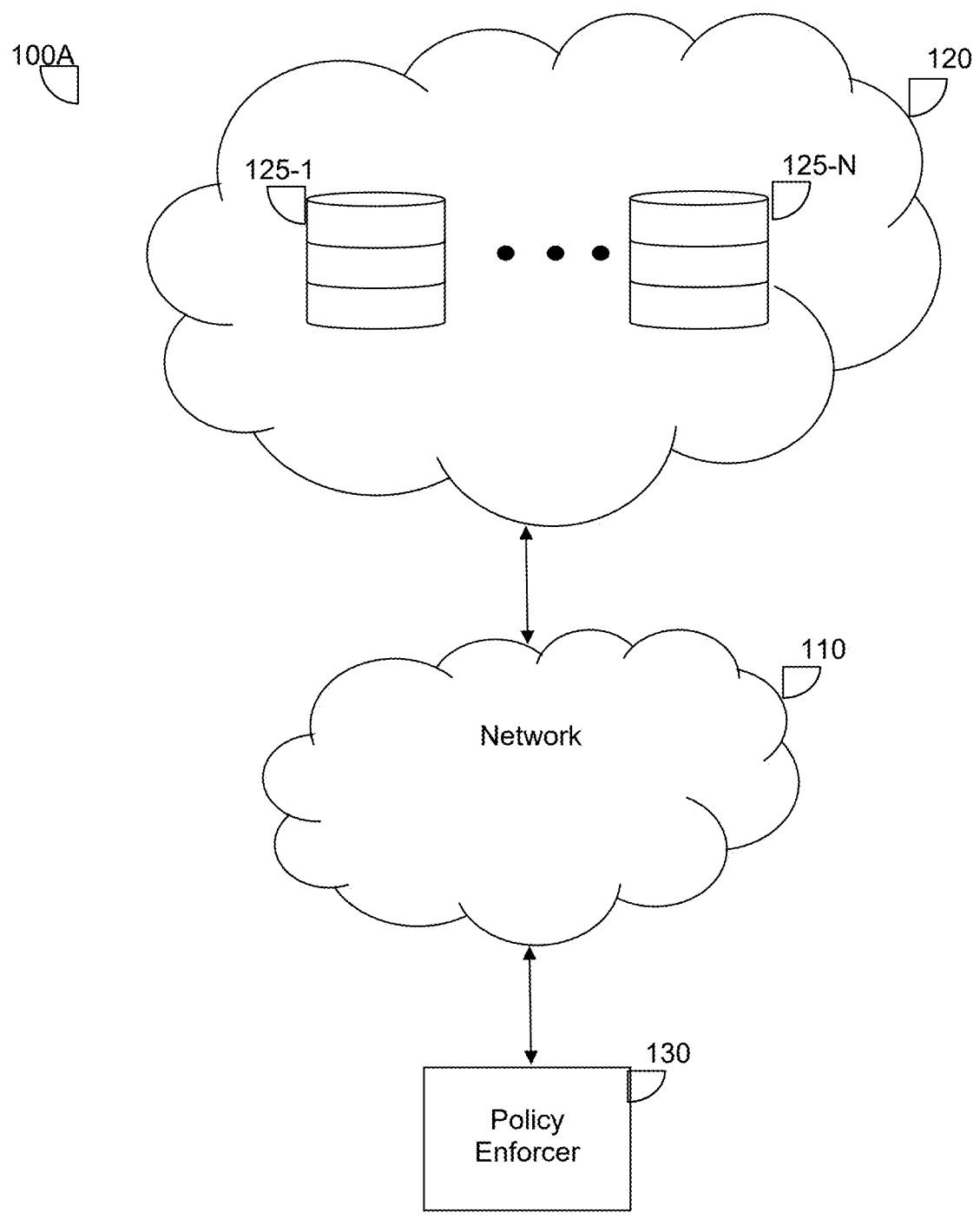
FIG. 1A is a network diagram utilized to describe various disclosed embodiments involving classifying data in disks.

The various disclosed embodiments include techniques for providing and using contextually-enriched classifications of data. In particular, the disclosed embodiments include techniques for classifying data according to contextually-enriched classifications and enforcing policies based on the contextually-enriched classifications. The disclosed embodiments can therefore be utilized to identify potential security or regulatory compliance risks of data stored in a computing environment, and may further allow for tailoring cybersecurity measures in order to reduce or mitigate risks.

In an embodiment, one or more contextual data classifications are determined for portions of data. The contextual data classifications may be enforced across different portions of data by identifying groupings of related data. To this end, in some embodiments, identifying such groupings of related data is facilitated by identifying roles of entities associated with different portions of data. Other contextual data classifications of portions of data in proximity to each other may be enforced further based on roles of data in proximity, for example, by applying contextual data classifications across portions of data which are in proximity and have the same role. Data in proximity may include, but is not limited to, data within the same table which has the same role, data within a predetermined distance (e.g., a distance defined with respect to a number of characters in unstructured text or otherwise in an unstructured document), or data in linked tables (e.g., first data in a first table may be considered proximate to second data in a second table when the second table is linked to the first table).

The roles may be utilized to identify subsets of data which are related by role in order to more accurately enforce classifications, that is, by enforcing classifications across data having the same role. In this regard, it is noted that data stored across related datasets or in the same dataset sharing a role in common tends to correspond to the same entity. Accordingly, classifications of data for that entity may be accurately enforced on data having the same role. This reduces misclassification which would be caused by enforcing classifications across all data in the same dataset (which may include data related to multiple entities such that the same classification is not applicable to all data in the dataset or datasets). Additionally, using roles in this manner allows for more efficiently determining portions of data for which classifications can be applied cross-data.

The contextual data classifications may include, but are not limited to, identifiability, geolocation, roles, data protection (e.g., a type of encryption, masking, or truncating data), and whether data is synthetic or not. The identifiability classification indicates whether a portion of data uniquely identifies a given entity (for example, a person), either individually or in combination with other proximate data, and may be utilized to enforce policies defined based on storing data that identifies specific users or other entities. The geolocation classification indicates a geographic affiliation or other geographic location of an entity represented in the data, and may be utilized to enforce policies based on geolocations of entities. The role classification indicates a relationship between an entity represented by a given portion of data and an entity which owns, uses, or otherwise controls the data. The data protection classification may indicate whether data is encrypted, what kind of encryption method is utilized, whether data is masked, whether data is truncated, and other information about protective actions that have been taken with respect to the data. The data protection classification may therefore be utilized to enforce policies defined based on storage of data with certain requirements on encryption. The synthetic data classification indicates whether a portion of data is likely synthetic, which may be utilized to enforce (or not enforce) policies, for example by avoiding considering synthetic data when enforcing a given policy.

Various classifications discussed in accordance with the disclosed embodiments may be used to define policies based on individual contextually enriched data classifications or combinations of those classifications. Moreover, policies may be defined per-tenant, per-platform, per-application or other software component, or with respect to other aspects of the computing environment in which the data is stored in order to enable flexible policy enforcement for data stored under different circumstances.

Additionally, policies defined in accordance with various embodiments may be defined with respect to different definitions of identifiable. For example, policies can be defined based on different combinations of data which may uniquely identify a given entity, thereby allowing for customization of policies for a given use case. Such policies may therefore be utilized in order to identify and alert on storage of identifiable data based on different criteria, and may further be used to provide information regarding the locations of any identifiable groups of data which may be utilized to determine potentially unsecure or otherwise impermissible storage of data. To this end, the policies may further be defined based on locations of proximate data making up a given group of identifiable data.

To aid in applying classifications to different portions of data, various embodiments include identifying related datasets and analyzing data across those related datasets for potential contextually enriched classifications. Data among related datasets may be determined to be proximate to data in other related datasets, and some or all of the classifications of data in a given set of related datasets may be applied to other portions of data in the same set of related datasets. Related datasets may include, but are not limited to, data in the same table, data in linked tables, unstructured data in files which are linked, or other datasets that are linked or grouped together. Identifying related datasets and enforcing classifications in this manner allows for automating classification of portions of data across different datasets, and allows for more accurately applying classifications cross-data. This, in turn, improves subsequent policy enforcement and any remediation to secure a computing environment storing the datasets.

In addition to various policy-based benefits discussed above, the disclosed techniques utilizing application of contextually-enriched classifications across different portions of data allows for more efficiently determining classifications for those different portions of data, i.e., by reducing the amount of processing needed to analyze the different portions of data for criteria related to potential contextually-enriched classifications. As a non-limiting example, a relatively lower cost (in terms of computing resources) role classification may be utilized to identify proximate data having the same role and applying any other contextually-enriched classifications to the proximate data having the same role rather than analyzing all potential iterations and combinations of data for such contextually-enriched classifications in a higher cost analysis. This, in turn, allows for providing contextually-enriched classifications in a scalable but accurate manner.

FIG. 1A shows an example network diagram 100A utilized to describe various disclosed embodiments. In the example network diagram 100, a policy enforcer 130 communicates with components in a cloud environment 120 via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

As shown in FIG. 1A, the cloud environment 120 includes various disks 125-1 through 125-N (hereinafter referred to individually as a disk 125 or collectively as disks 125 for simplicity). The disks 125 may be, but are not limited to, hard drive disks, virtual disks, and the like. Some of the disks 125 may contain data stores (not depicted in FIG. 1A) and therefore data in such data stores may be classified as described herein in order to provide certain security features to protect those data stores. To this end, the policy enforcer 130 is configured to scan data structures in the cloud environment 120 in order to identify which of the disks 125 contain data stores, to access data in identified data stores, or both, and therefore identify where protective measures may be needed in order to protect the data stores. More specifically, in accordance with various disclosed embodiments, the policy enforcer 130 is configured to classify data in and among the disks 125 as discussed herein, and to enforce policies based on those classifications.

Figure 1B:
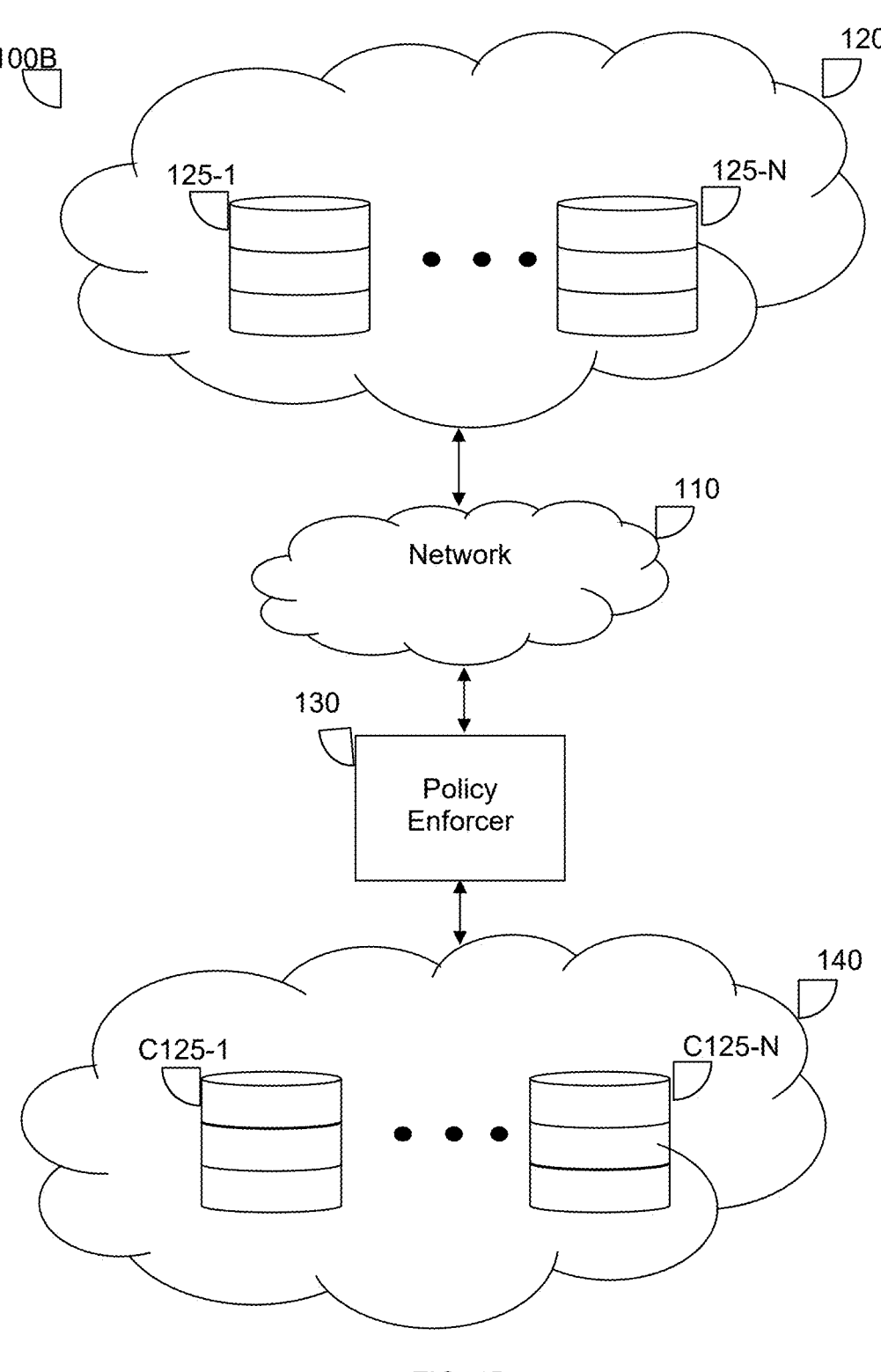
FIG. 1B is a network diagram utilized to describe various disclosed embodiments involving classifying data in copies of disks.

FIG. 1B further shows disk copies C125-1 through C125-N (hereinafter referred to as disk copies C125 for simplicity) that are copies of respective disks 125 which may be created in order to facilitate classification in accordance with some embodiments. The disk copies C125 are created and connected to engines (not shown) run via the policy enforcer 130, for example via one or more virtual machines running on the policy enforcer 130. Example techniques for copying disks which may be used to more efficiently scan disks (and, consequently, more efficiently classify data identified via such scans) are described further in U.S. patent application Ser. No. 17/647,899, assigned to the common assignee, the contents of which are hereby incorporated by reference.

It should be noted that a single policy enforcer 130 is depicted for simplicity purposes, but that multiple systems configured to enforce in accordance with the various disclosed embodiments may be utilized without departing from the scope of the disclosure. Each classification system may run one or more virtual machines, each virtual machine being configured with one or more engines as described herein.

Figure 2:
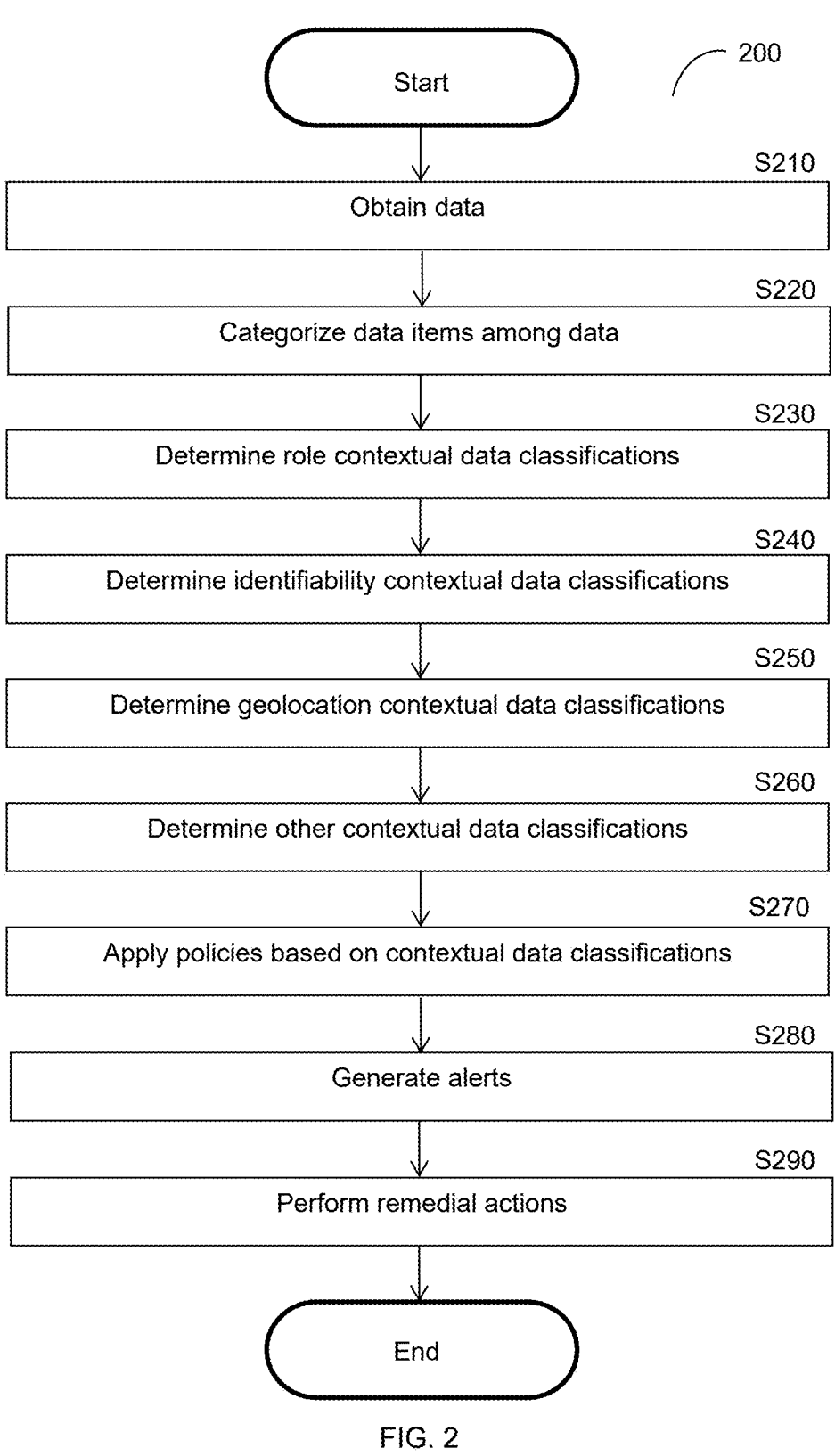
FIG. 2 is a flowchart illustrating a method for enforcing policies based on contextually enriched data classifications according to an embodiment.

FIG. 2 is a flowchart 200 illustrating a method for enforcing policies based on contextually enriched data classifications according to an embodiment. In an embodiment, the method is performed by the policy enforcer 130, FIGS. 1A-B.

At S210, data is obtained. Specifically, the data may be or may include data stored in one or more databases which might store data containing sensitive information such as personally identifiable information (PII). As a non-limiting example, the data may be data stored in any or all of the disks 125, FIGS. 1A-B, or in any of the copies of disks C125, FIG. 1B.

At S220, data items among the data are categorized. More specifically, S220 includes applying one or more data categorization rules defining criteria for identifying certain data items or other portions of the data as indicating certain predetermined types of information. To this end, such data categorization rules may be defined with respect to formatting of data items, values of data items, data types of data items (e.g., integer, Boolean, float, string, etc.), combinations thereof, portions thereof, and the like. As non-limiting examples, the data categorizations may include email address, credit card, and the like.

At S230, role contextual data classifications are determined for the data. The role contextual data classifications (also referred to herein as simply role classifications) are indicative of data which is related to other data by role defined with respect to entities. That is, each role contextual data classification indicates a relationship between an entity represented by a given portion of data and an entity which owns, uses, or otherwise controls the data. Accordingly, having a role in common between different portions of data indicates that the portions of data are related to an entity having the same role (as a non-limiting example, the same role with respect to a service or organization). Non-limiting example roles which may be represented by respective role contextual data classifications include customer, employee, patient, dealer, contractor, candidate, and the like.

In some embodiments, the role contextual data classifications may be utilized to identify subsets of data which are related by role in order to more accurately enforce classifications, that is, by enforcing classifications across data having the same role. Using roles in this manner allows for more efficiently determining portions of data for which classifications can be applied cross-data while accurately identifying data based on context rather than only based on proximity or other factors which do not account for what the data represents. Moreover, using role and proximity in tandem as described herein allows for further improving accuracy of classification enforcement across different portions of data, thereby allowing for accurately classifying data more efficiently as compared to classifying each portion of data separately.

Additionally, in at least some embodiments, roles may be used to determine other classifications of data such as, but not limited to, classifications related to identifiability (i.e., classifications indicating degrees to which data or combinations of data may identify a particular user). As a non-limiting example, certain kinds of data may be quasi-identifiable in the sense that no single data item uniquely identifies a particular user on its own, but multiple quasi-identifiable portions of data may identify a particular user when combined. By analyzing data having the same role which is in proximity, groupings of quasi-identifiable data may be classified collectively as being identifiable data and policies may be enforced accordingly.

In an embodiment, determining the role contextual data classifications includes determining scores for portions of data among a grouping of data and determining grades defined with respect to respective roles based on those scores. To this end, determining the scores may further include applying one or more score determination rules defined with respect to heuristics related to values or fields which might correspond to certain roles. As a non-limiting example, such rules may apply a higher score for the classification "customer" when a field includes a credit card number (e.g., based on a predetermined known format for credit card numbers) than for the classification "employee" (i.e., because in the environment in which this rule is applied, customer credit card information is more likely to be collected than that of employees).

As a non-limiting example, certain roles may include customer and employee, i.e., data classified as having the "customer" role classification describes or otherwise relates to a customer, while data classified as having the "employee" role classification describes or otherwise relates to an employee. Policies related to security of data may differ between customer data and employee data such that identifying data as belonging to either a customer or employee allows for applying the correct security measures. Moreover, data within the same table or otherwise within proximity to other data having the same role (e.g., customer or employee) may be determined as belonging to the same role (e.g., customer or employee), which in turn may allow for determining certain other classifications for other portions of data in proximity. As a non-limiting example, geolocation data within the same table as customer role data may be classified as personal geolocation data, while geolocation data within the same table as employee role data may be classified as company geolocation data.

In a further embodiment, data in proximity may include, but is not limited to, data within the same table which has the same role, data within a predetermined distance (e.g., a distance defined with respect to a number of characters in unstructured text or otherwise in an unstructured document), data in linked tables (e.g., first data in a first table may be considered proximate to second data in a second table when the second table is linked to the first table), data among related datasets, a combination thereof, and the like.

Related datasets may include, but are not limited to, data in the same table, data in linked tables, unstructured data in files which are linked, or other datasets that are linked or grouped together. Identifying related datasets and enforcing classifications in this manner allows for automating classification of portions of data across different datasets, and allows for more accurately applying classifications cross-data. This, in turn, improves subsequent policy enforcement and any remediation to secure a computing environment storing the datasets.

An example process which may be utilized to determine role contextual classifications is described further below with respect to FIG. 3.

At S240, identifiability contextual data classifications are determined for the data. In an embodiment, each identifiability contextual data classification (also referred to herein as simply identifiability classifications) indicates whether a portion of data uniquely identifies a given entity (for example, a person), either individually or in combination with other proximate data, and may be utilized to enforce policies defined based on storing data that identifies specific users or other entities.

In an embodiment, determining the identifiability contextual data classifications includes determining uniquely identifying portions of data (e.g., portions of data which uniquely identify only a single entity and no other entities) and identifying proximate quasi-identifiable portions of data relative to the uniquely identifying portions of data in order to determine identifiable groups of quasi-identifiable data. Roles of proximate data may be analyzed in order to enforce identifiability classifications across proximate data having the same role.

An example process which may be utilized to determine identifiability contextual classifications is described further below with respect to FIG. 4.

At S250, geolocation contextual data classifications are determined for the data. In an embodiment, each geolocation contextual data classification (also referred to herein as simply geolocation classifications) indicates a geographic affiliation or other geographic location of an entity represented in the data, and may be utilized to enforce policies based on geolocations of entities.

In an embodiment, determining the geolocation contextual data classifications includes identifying geolocation-indicating data among related datasets and analyzing the geolocation-indicating data in order to determine geolocations represented among the data. Roles of proximate data may be analyzed in order to apply determined geolocation classifications across proximate data having the same role. An example process which may be utilized to determine geolocation contextual classifications is described further below with respect to FIG. 5.

At S260, other contextual data classifications may be determined. The other contextual data classifications may include, but are not limited to, data protection status classifications, synthetic data classifications, both, and the like.

The data protection status classifications are defined at least with respect to a type of data protection which is applied to the data, and may further be defined with respect to a subtype of data protection (e.g., a specific scheme, method, or technique used to protect the data). In some embodiments, the types of data protection may include a null type, i.e., a type representing that no data protection measures (or no known data protection measures among a set of predetermined data protection measures) is applied to the data. The data protection status classifications may represent, for example, whether data is encrypted, masked, or truncated. Alternatively or in combination, the data protection status classifications may indicate a type of encryption, masking, or truncation (e.g., as defined with respect to a scheme, method, or technique used in order to perform such data protection actions). Accordingly, such a data protection classification may be utilized to enforce policies defined based on storage of data with certain requirements on encryption.

The synthetic data classification indicates whether a portion of data is likely synthetic, which may be utilized to enforce (or not enforce) policies, for example by avoiding considering synthetic data when enforcing a given policy.

At S270, one or more policies are applied based on the contextual data classifications determined at any or all of S230 through S260. The policies may define acceptable and unacceptable activities with respect to data such as, but not limited to, permitted actions with respect to data having certain classifications, forbidden actions with respect to data having certain classifications, permissible and impermissible locations to store data having certain classifications, whether certain classifications of data must be protected (e.g., via encryption, masking, truncation, etc.), combinations thereof, and the like. The policies may therefore be utilized to determine if different portions of the data is being handled properly for cybersecurity purposes, thereby allowing for more effectively securing data against potential cyber threats.

In an embodiment, the policies are defined with respect to any or all of the contextual data classifications discussed herein. In a further embodiment, the policies may be defined per-tenant, per-platform, per-application or other software component, or with respect to other aspects of the computing environment in which the data is stored in order to enable flexible policy enforcement for data stored under different circumstances.

In a further embodiment, the policies are defined further with respect to criteria related to different degrees, types, or otherwise different definitions of identifiability. As a non-limiting example, policies can be defined based on different combinations of data which may uniquely identify a given entity, thereby allowing for customization of policies for a given use case. Such policies may therefore be utilized in order to identify and alert on storage of identifiable data based on different criteria, and may further be used to provide information regarding the locations of any identifiable groups of data which may be utilized to determine potentially unsecure or otherwise impermissible storage of data. To this end, the policies may further be defined based on locations of proximate data making up a given group of identifiable data.

At S280, one or more alerts are generated in response to one or more violations of the policies applied at S270. The alerts may indicate, for example but not limited to, whether a given dataset or portion of data violates a policy, which policy or policies were violated, both, and the like.

At S290, one or more remedial actions are performed to remediate potential cyber threats represented by the violations of the policies. Non-limiting example remedial actions may include, but are not limited to, generating notifications, performing one or more data protection actions (e.g., encrypting, masking, truncating, etc.), preventing systems from accessing a data store in which the data is stored, combinations thereof, and the like.

Figure 3:
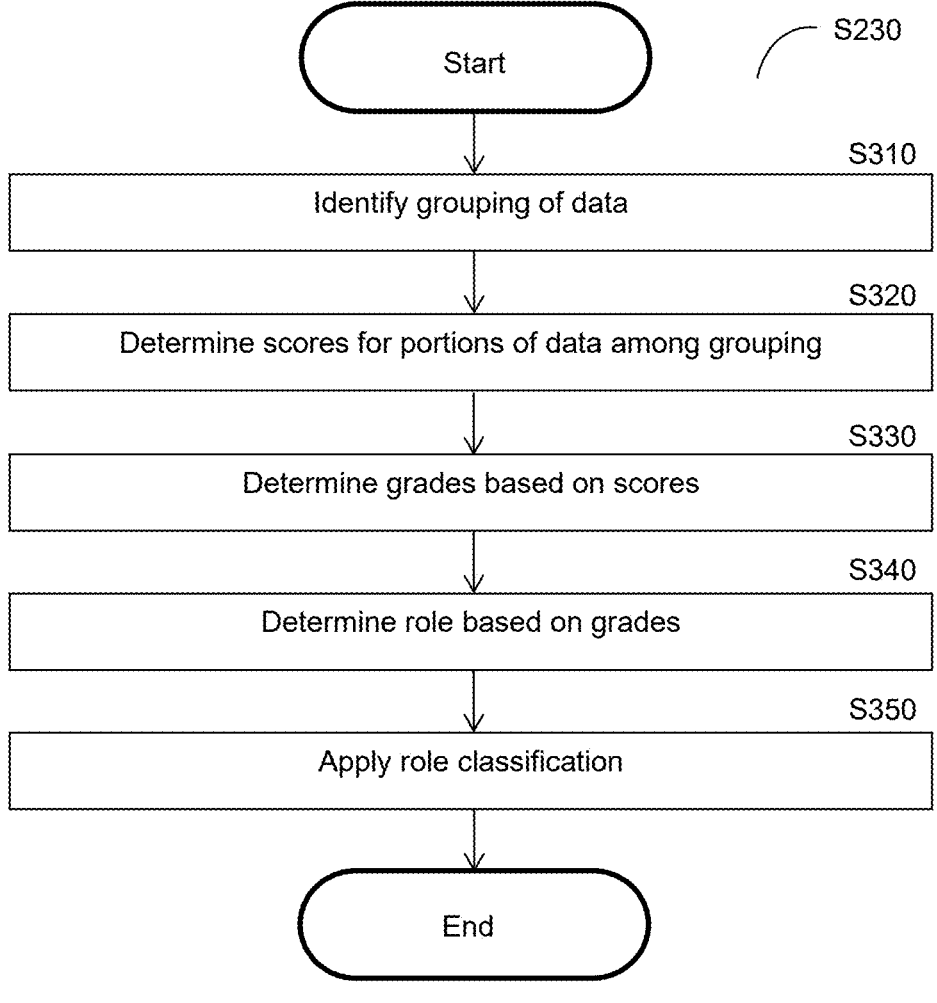
FIG. 3 is a flowchart illustrating a method for determining role contextual data classifications according to an embodiment.

FIG. 3 is a flowchart S230 illustrating a method for determining role contextual data classifications according to an embodiment.

At S310, a grouping of data is identified. In an embodiment, the grouping of data includes data from related datasets such as, but not limited to, data in the same table, data in linked tables, unstructured data in files which are linked, or other datasets that are linked or designated as associated (e.g., as indicated in metadata).

At S320, scores are determined for respective portions of data among the grouping of data. Each score may indicate a likelihood that a given portion of data belongs to a respective role, and scores may be determined for each possible role for each portion of data. In an embodiment, determining the scores includes applying one or more score determination rules defined with respect to heuristics related to values or fields which might correspond to certain roles. As a non-limiting example, such rules may apply a higher score for the classification "customer" when a field includes a credit card number (e.g., based on a predetermined known format for credit card numbers) than for the classification "employee" (i.e., because in the environment in which this rule is applied, customer credit card information is more likely to be collected than that of employees).

At S330, grades are determined based on the scores. Each grade is a representation of a likelihood that the grouping of data belongs to a respective role and may be determined based on the determined scores for that portion of data. In other words, each grade may be or may be determined based on an average or aggregated score for scores corresponding to the same role for different portions of data among the group. In some implementations, each grade may be a numerical value representing the likelihood that a respective role applies to the grouping of data.

At S340, a role is determined based on the grades. In an embodiment, S340 includes determining whether the grade corresponding to each role is above a predetermined threshold. In some embodiments, if multiple grades are above the threshold, the role corresponding to the highest grade may be determined as the role for the grouping of data. Alternatively, other tiebreaking rules may be utilized to determine which role to select for the grouping of data.

In some embodiments, when none of the grades are above a threshold (i.e., indicating that none of the possible roles which were scored is applicable to the grouping of data), a potential new role may be suggested for the grouping of data. The potential new role may be, for example, a role determined by analyzing the portions of data among the grouping of data for commonalities (e.g., common values or portions of values such as common words or other shares strings). The potential new role may be assigned a name corresponding to such commonalities. As a non-limiting example, when different portions of data among the group include the word "doctor" for a grouping of data related to a hospital, a new role named "doctor" may be suggested. The potential new role may be suggested by generating and sending a notification to a user, or may be utilized as the role for that grouping of data.

At S350, a role classification representing the determined role is applied to the grouping of data. In an embodiment, applying the role classification across the grouping of data includes adding metadata indicating the role classification for one portion of data the grouping of data to other portions of data among the grouping of data.

Figure 4:
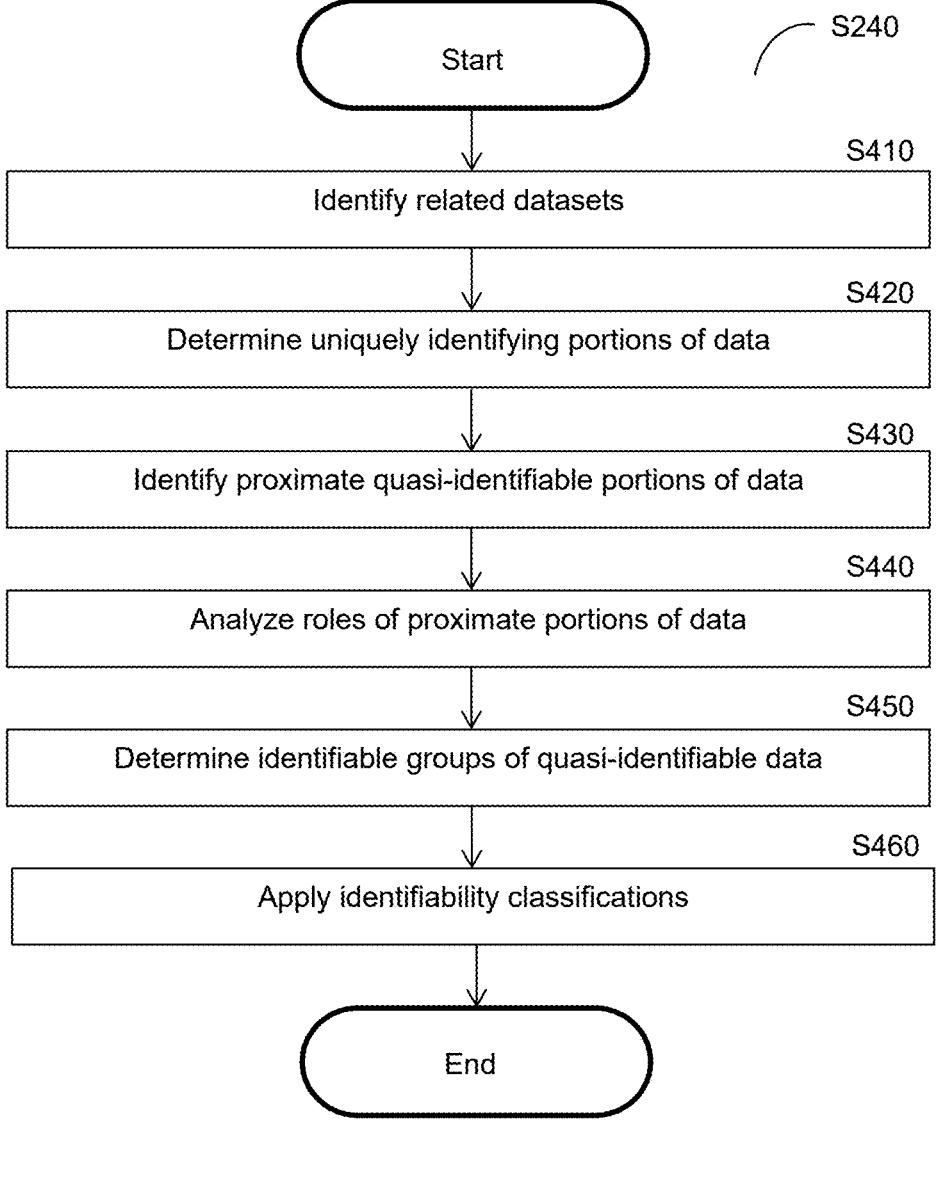
FIG. 4 is a flowchart illustrating a method for determining identifiability contextual data classifications according to an embodiment.

FIG. 4 is a flowchart S240 illustrating a method for determining identifiability contextual data classifications according to an embodiment.

At S410, related datasets are identified. The related datasets may include, for example but not limited to, data in the same table, data in linked tables, unstructured data within a predetermined distance of each other (e.g., a distances as measured by a number of characters or other measurement of amount of data between different portions of data), and the like.

At S420, uniquely identifying portions of data are identified. In an embodiment, the uniquely identifying portions of data are portions of data which uniquely identify a given individual by themselves, i.e., a uniquely identifying portion of data can be used to identify an individual and no other individual without any additional data. For example, data such as social security number may be known to correspond one-to-one with individuals (i.e., no two individuals have the same social security number) such that a portion of data indicating social security number can be used to uniquely identify a single individual without any other data, while city of residence would not uniquely identify a particular individual since more than one individual can reside in the same city.

In an embodiment, S420 includes applying one or more uniquely identifying data rules which define criteria for identifying data as being uniquely identifying for a given person. In a further embodiment, the uniquely identifying data rules may be defined with respect to data classes. Specifically, some predetermined data classes may be defined in the rules as being uniquely identifying by default such that any data having one of these predetermined data classes is determined as being uniquely identifying data.

As a non-limiting example, data having a data class "social security number" may be indicated among the rules as one of the predetermined data classes which are uniquely identifying because social security numbers are unique to different individuals such that any data having the social security number data class is determined as being uniquely identifying. As a contrasting example, data having a data class "drug name" might not be indicated as uniquely identifying by itself because the same pharmaceutical product might be assigned to different individuals, and the uniquely identifying data rules may therefore exclude "drug name" from the predetermined data classes known to be uniquely identifying.

At S430, proximate quasi-identifiable portions of data are identified. The quasi-identifiable portions of data includes data which does not uniquely identify a single individual by itself, but can be used to uniquely identify a single individual when combined with other data. To this end, in an embodiment, identifying proximate quasi-identifiable portions of data includes determining a proximity between different portions of data among the quasi-identifiable portions of data. The proximity may be represented in a binary manner (e.g., either proximate or not proximate), or may be represented as a degree of proximity (e.g., as measured based on distance between portions of data).

In an embodiment, multiple quasi-identifiable portions of data are determined to be proximate (i.e., proximate to each other) when those quasi-identifiable portions of data are within the same table and have the same role, are within a predetermined distance from each other (e.g., a distance defined with respect to a number of characters in unstructured text or otherwise in an unstructured document), or present in linked tables (e.g., first data in a first table may be considered proximate to second data in a second table when the second table is linked to the first table).

In this regard, it is noted that identifying data such as personally identifiable information (PII) data can be found within datasets using a naïve approach based on direct analysis of larger amounts of data, but this approach would be less efficient as it requires analyzing a larger amount of potential combinations of portions of data. Additionally, such an approach may result in false positive, for example due to combinations of portions of data for different individuals being analyzed as if they belonged to the same individual. By analyzing quasi-identifiable data based on proximity (e.g., by analyzing sets including multiple portions of quasi-identifiable data which are determined to be proximate to each other), groups of quasi-identifiable data portions that collectively uniquely identify an individual may be more accurately identified while reducing the number of potential combinations of portions of data which must be analyzed or otherwise reducing the total amount of data which needs to be checked for meeting criteria for determining groups of quasi-identifiable data.

At optional S440, roles of proximate portions of data are determined. In an embodiment, determining the roles may include determining role contextual data classifications, for example as discussed above with respect to FIG. 3.

At S450, groups of quasi-identifiable data are determined. In an embodiment, each group of quasi-identifiable data includes multiple portions of data, each of which is quasi-identifiable, where each portion of the data is proximate to other portions among those multiple portions of data.

In an embodiment, identifying the groups of quasi-identifiable data includes applying quasi-identifiable data identification rules defined with respect to known characteristics of data which, though not capable of identifying a particular individual on its own, could be combined with other data in order to identify a particular individual. To this end, such characteristics may include, but are not limited to, format (e.g., as defined with respect to data type, order, number of characters, combinations thereof, etc.), specific predetermined values (e.g., values representing terms known to be associated with quasi-identifiable data), fields in which values are disposed (e.g., predetermined fields known to be associated with quasi-identifiable data), combinations thereof, and the like.

At S460, identifiability classifications indicating the identifiable groups of quasi-identifiable data are applied across the groups of quasi-identifiable data. The identifiability classifications may include or otherwise indicate, for example, whether data is identifiable (e.g., whether the data uniquely identifies a single individual by itself), whether the data is part of a group of quasi-identifiable data that collectively identifies a single individual, and the like.

In some embodiments, the identifiability classifications may further indicate identifiability in accordance with different identifiability schemes. In this regard, it is noted that different countries, regions, or other jurisdictions may have different criteria defining which data or combinations of data are considered to be identifying for a given individual. To this end, the identifiability classifications for a given portion of data may include multiple identifiability classifications corresponding to different jurisdictions or may otherwise include an identifiability classification indicating whether the data is considered to be identifying with respect to multiple jurisdictions. Alternatively or in combination, the identifiability classifications may indicate whether data is identifiable under different definitions (e.g., whether data is considered identifiable for purposes of determining whether a data breach involving identifiable data must be reported).

Figure 5:
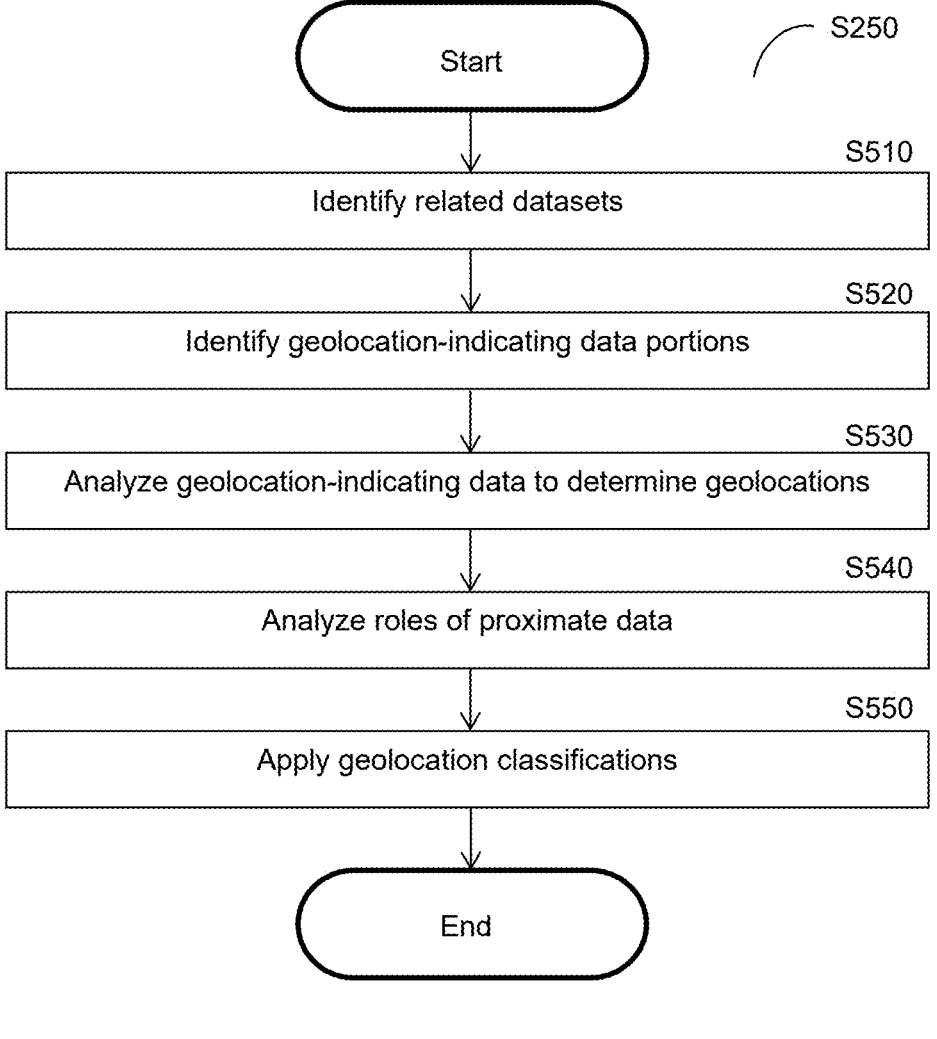
FIG. 5 is a flowchart illustrating a method for determining geolocation contextual data classifications according to an embodiment.

FIG. 5 is a flowchart S250 illustrating a method for determining geolocation contextual data classifications according to an embodiment.

At S510, related datasets are identified. The related datasets may include, for example but not limited to, data in the same table, data in linked tables, unstructured data within a predetermined distance of each other (e.g., a distances as measured by a number of characters or other measurement of amount of data between different portions of data), and the like.

At S520, geolocation-indicating portions of data are identified. In an embodiment, identifying the geolocation-indicating portions of data includes applying geolocation data identification rules defined with respect to values or portions thereof which likely indicate a geolocation of a person represented in the data. The geolocation data identification rules may be defined with respect to predetermined values (e.g., names of known locations), predetermined fields (e.g., fields such as "country" or address" which are known to correspond to geolocations), both, and the like.

At S530, the identified geolocation-indicating portions of data are analyzed in order to determine geolocations. Determining the geolocations may include, for example but not limited to, matching values among the geolocation-indicating portions of data to a predetermined list of known geolocation values and their corresponding geolocations. Alternatively or in combination, determining the geolocations may include accessing a service configured to identify a geolocation based on data related to the geolocation such as, but not limited to, a map service (e.g., a service which takes coordinates and maps them to different geolocations), an artificial intelligence service (e.g., a large language model which is queried using values among the geolocation-indicating data in order to request textual data indicating a geolocation indicated by the geolocation-indicating data), and the like.

At optional S540, roles of proximate data are analyzed. In an embodiment, analyzing the roles may include determining role contextual data classifications, for example as discussed above with respect to FIG. 3. The roles may be analyzed in order to determine whether any of the geolocations determined at S530 should be applied to their respective portions of data. That is, in some optional embodiments, a geolocation determined for a given portion of data may not be determined as representing a personally identifiable geolocation. As a non-limiting example, when the role of a portion of data is determined to be "company" (i.e., not a portion of data relating to a person as an individual), then a geolocation represented in that portion of data may be determined to not be an identifying geolocation because the geolocation represents a company geolocation (e.g., a geolocation of a company that the individual works at) rather than a geolocation of an individual.

This may allow for further improving the accuracy of geolocation classification when the classification is used for purposes of securing personally identifying information (PII) data. For example, by identifying geolocation data as belonging to a company, the corresponding geolocation classification may not be applied to other portions of data related to individuals because the company geolocation is not a geolocation of the individuals working in or with the company and the company geolocation would therefore not be an accurate geolocation for those individuals.

As noted above, data in proximity (i.e., proximate data) may include, but is not limited to, data within the same table which has the same role, data within a predetermined distance (e.g., a distance defined with respect to a number of characters in unstructured text or otherwise based on an amount of data in between within an unstructured document), or data in linked tables (e.g., first data in a first table may be considered proximate to second data in a second table when the second table is linked to the first table).

At S550, geolocation classifications indicating the geolocation are applied across the related datasets. Applying the geolocation classifications across each related dataset may include, but is not limited to, adding metadata indicating the geolocation classification for one portion of data among related datasets to other portions of data among the related datasets or otherwise storing data indicating a classification for portions of data which matches the geolocation classification being applied across those portions of data.

In some embodiments, the geolocation classifications are applied only across data having the same role or combination of roles within each related dataset. That is, in such an embodiment, for a given portion of data having a role, the geolocation classification for that portion of data is only applied to other portions of data in the same or related datasets which also have the same role as that portion of data.

Figure 6:
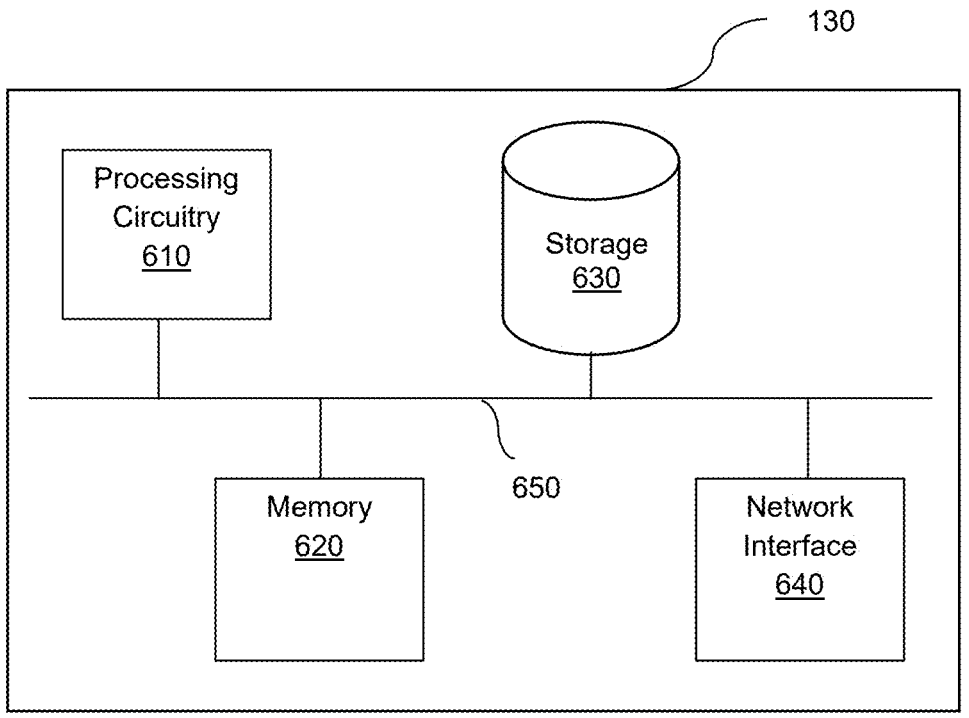
FIG. 6 is a schematic diagram of a policy enforcer according to an embodiment.

FIG. 6 is an example schematic diagram of a policy enforcer 130 according to an embodiment. The policy enforcer 130 includes a processing circuitry 610 coupled to a memory 620, a storage 630, and a network interface 640. In an embodiment, the components of the policy enforcer 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the policy enforcer 130 to communicate with, for example, the cloud environment 120 (particularly, the disks 125 and the copy disks C125 in the cloud environment 120).

It should be understood that the embodiments described herein are not limited to the specific architecture illustrated in FIG. 6, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for data classification, comprising:

determining a role for each of a plurality of portions of data among a plurality of datasets, wherein the role for each of the plurality of portions of data is defined with respect to a corresponding entity having at least one characteristic represented by the respective portion of data;

classifying each of the plurality of portions of data into a plurality of classifications, wherein classifying at least one first portion of data among the plurality of portions of data further comprises applying a classification for at least one second portion of data among the plurality of portions of data to the at least one first portion of data, wherein the role of the at least one first portion of data and the role of the at least one second portion of data match; and performing at least one remediation action to secure a computing environment storing the plurality of datasets based on the plurality of classifications.

2. The method of claim 1, wherein performing the at least one remediation action further comprises:

applying at least one security policy to the plurality of portions of data based on the plurality of classifications and at least one activity performed with respect to at least one of the plurality of portions of data.

3. The method of claim 1, wherein determining the role for each of the plurality of portions of data further comprises:

determining a plurality of role scores for each of the plurality of portions of data, wherein each role score corresponds to a role among a plurality of potential roles and indicates a likelihood that the respective portion of data belongs to the corresponding role, wherein the role for each of the plurality of portions of data is determined based on the plurality of role scores for the portion of data.

4. The method of claim 3, further comprising:

grouping at least some of the plurality of portions of data into at least one data grouping; and determining a plurality of grades for each data grouping based on the role scores for each of the portions of data among the data grouping, wherein each grade corresponds to a role and indicates a likelihood that the respective data grouping belongs to the corresponding role, wherein the role for each of the plurality of portions of data is determined based further on the plurality of grades for the at least one data grouping.

5. The method of claim 4, wherein each of the at least one data grouping includes a subset of the plurality of portions of data which are at least one of: in a same table, in linked tables, and in linked files.

6. The method of claim 1, wherein the plurality of classifications includes a plurality of identifiability classifications, each identifiability classification corresponding to a respective portion of data among the plurality of portions of data, wherein the identifiability classification for a portion of data indicates whether the portion of data uniquely identifies an individual.

7. The method of claim 6, further comprising:

identifying at least one quasi-identifiable portion of data among the plurality of portions of data, wherein each quasi-identifiable portion of data includes data which uniquely identifies an individual when combined with other quasi-identifiable portions of data, wherein the plurality of identifiability classifications is determined based on the identified at least one quasi-identifiable portion of data.

8. The method of claim 7, wherein the at least one quasi-identifiable portion of data is a plurality of quasi-identifiable portions of data, further comprising:

determining a proximity between at least some of the plurality of quasi-identifiable portions of data, wherein the plurality of identifiability classifications is determined based further on the determined proximity between at least some of the plurality of quasi-identifiable portions of data.

9. The method of claim 1, wherein the plurality of classifications includes a plurality of geolocation classifications, each geolocation classification corresponding to a respective portion of data among the plurality of portions of data, wherein the geolocation classification for each portion of data indicates a geolocation of the corresponding entity for the portion of data.

10. The method of claim 1, wherein the plurality of portions of data are classified with respect to data protection status, wherein the data protection status for each of the plurality of portions of data is defined with respect to a type of data protection which is applied to the respective portion of data.

11. The method of claim 1, wherein the plurality of portions of data are classified with respect to a likelihood that each of the plurality of portions of data is synthetic.

12. A non-transitory computer readable medium having stored thereon instructions for causing a processing circuitry to execute a process, the process comprising:

determining a role for each of a plurality of portions of data among a plurality of datasets, wherein the role for each of the plurality of portions of data is defined with respect to a corresponding entity having at least one characteristic represented by the respective portion of data;

classifying each of the plurality of portions of data into a plurality of classifications, wherein classifying at least one first portion of data among the plurality of portions of data further comprises applying a classification for at least one second portion of data among the plurality of portions of data to the at least one first portion of data, wherein the role of the at least one first portion of data and the role of the at least one second portion of data match; and performing at least one remediation action to secure a computing environment storing the plurality of datasets based on the plurality of classifications.

13. A system for data classification, comprising:

a processing circuitry; and a memory, the memory containing instructions that, when executed by the processing circuitry, configure the system to:

determine a role for each of a plurality of portions of data among a plurality of datasets, wherein the role for each of the plurality of portions of data is defined with respect to a corresponding entity having at least one characteristic represented by the respective portion of data;

classify each of the plurality of portions of data into a plurality of classifications, wherein classifying at least one first portion of data among the plurality of portions of data further comprises applying a classification for at least one second portion of data among the plurality of portions of data to the at least one first portion of data, wherein the role of the at least one first portion of data and the role of the at least one second portion of data match; and perform at least one remediation action to secure a computing environment storing the plurality of datasets based on the plurality of classifications.

14. The system of claim 13, wherein the system is further configured to:

apply at least one security policy to the plurality of portions of data based on the plurality of classifications and at least one activity performed with respect to at least one of the plurality of portions of data.

15. The system of claim 13, wherein the system is further configured to:

determine a plurality of role scores for each of the plurality of portions of data, wherein each role score corresponds to a role among a plurality of potential roles and indicates a likelihood that the respective portion of data belongs to the corresponding role, wherein the role for each of the plurality of portions of data is determined based on the plurality of role scores for the portion of data.

16. The system of claim 15, wherein the system is further configured to:

group at least some of the plurality of portions of data into at least one data grouping; and determine a plurality of grades for each data grouping based on the role scores for each of the portions of data among the data grouping, wherein each grade corresponds to a role and indicates a likelihood that the respective data grouping belongs to the corresponding role, wherein the role for each of the plurality of portions of data is determined based further on the plurality of grades for the at least one data grouping.

17. The system of claim 16, wherein each of the at least one data grouping includes a subset of the plurality of portions of data which are at least one of: in a same table, in linked tables, and in linked files.

18. The system of claim 13, wherein the plurality of classifications includes a plurality of identifiability classifications, each identifiability classification corresponding to a respective portion of data among the plurality of portions of data, wherein the identifiability classification for a portion of data indicates whether the portion of data uniquely identifies an individual.

19. The system of claim 18, wherein the system is further configured to:

identify at least one quasi-identifiable portion of data among the plurality of portions of data, wherein each quasi-identifiable portion of data includes data which uniquely identifies an individual when combined with other quasi-identifiable portions of data, wherein the plurality of identifiability classifications is determined based on the identified at least one quasi-identifiable portion of data.

20. The system of claim 19, wherein the at least one quasi-identifiable portion of data is a plurality of quasi-identifiable portions of data, wherein the system is further configured to:

determine a proximity between at least some of the plurality of quasi-identifiable portions of data, wherein the plurality of identifiability classifications is determined based further on the determined proximity between at least some of the plurality of quasi-identifiable portions of data.

21. The system of claim 13, wherein the plurality of classifications includes a plurality of geolocation classifications, each geolocation classification corresponding to a respective portion of data among the plurality of portions of data, wherein the geolocation classification for each portion of data indicates a geolocation of the corresponding entity for the portion of data.

22. The system of claim 13, wherein the plurality of portions of data are classified with respect to data protection status, wherein the data protection status for each of the plurality of portions of data is defined with respect to a type of data protection which is applied to the respective portion of data.

23. The system of claim 13, wherein the plurality of portions of data are classified with respect to a likelihood that each of the plurality of portions of data is synthetic.

* * * * *